(12) United States Patent
Sato et al.

(10) Patent No.: US 7,246,228 B2
(45) Date of Patent: Jul. 17, 2007

(54) COMMUNICATION SYSTEM, TERMINAL DEVICE, REPRODUCTION PROGRAM, STORAGE MEDIUM STORING THE REPRODUCTION PROGRAM, SERVER MACHINE, SERVER PROGRAM, AND STORAGE MEDIUM STORING THE SERVER PROGRAM

(75) Inventors: Katsuhiko Sato, Soraku-gun (JP); Yuji Sawada, Osaka (JP); Keisuke Iwasaki, Ikoma-gun (JP); Kazuyuki Nako, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 817 days.

(21) Appl. No.: 10/398,254

(22) PCT Filed: Sep. 28, 2001

(86) PCT No.: PCT/JP01/08607

§ 371 (c)(1),
(2), (4) Date: Apr. 2, 2003

(87) PCT Pub. No.: WO02/35362

PCT Pub. Date: May 2, 2002

(65) Prior Publication Data

US 2004/0024860 A1    Feb. 5, 2004

(30) Foreign Application Priority Data

Oct. 26, 2000  (JP)  ............................. 2000-327721

(51) Int. Cl.
*G06F 1/24*    (2006.01)
*G06F 15/177*  (2006.01)

(52) U.S. Cl. .................. 713/100; 709/220; 709/223
(58) Field of Classification Search ............... 709/220, 709/223, 229; 726/2, 29; 713/100, 169
See application file for complete search history.

(56) References Cited

U.S. PATENT DOCUMENTS 6,158,005 A * 12/2000 Bharathan et al. ............ 726/29
6,170,060 B1 * 1/2001 Mott et al. ..................... 726/29

(Continued)

FOREIGN PATENT DOCUMENTS

| JP | 64-048151 | 2/1989 |
| JP | 04-232586 | 8/1992 |
| JP | 09-134330 | 5/1997 |
| JP | 11-272565 | 10/1999 |
| JP | 2000-228061 | 8/2000 |
| WO | WO 99/18506 | 4/1999 |

*Primary Examiner*—Nasser Moazzami
*Assistant Examiner*—Shanto M Z Abedin
(74) *Attorney, Agent, or Firm*—Davie G. Conlin; David A. Tucker; Edwards Angell Palmer & Dodge LLP

(57) ABSTRACT

Reproduction means of a general-purpose computer (1) reproduces a digital content only when a device ID included in the digital content corresponds to a device ID of a device by which it is intended to reproduce the digital content. When the device ID of the general-purpose computer (1) is altered, a recovery program for recovering an original device ID is downloaded from a recovery program generation server (2), thereby the device ID is recovered. With this arrangement, it is possible to provide a communication system which is capable of recovering a device ID when, for instance, the device ID is altered on account of the reinstall of a program such as an OS or content player.

10 Claims, 8 Drawing Sheets

U.S. PATENT DOCUMENTS

| | | | |
|---|---|---|---|
| 6,243,468 B1 * | 6/2001 | Pearce et al. | 380/255 |
| 6,609,116 B1 * | 8/2003 | Lotspiech | 705/57 |
| 2001/0044896 A1 * | 11/2001 | Schwartz et al. | 713/169 |
| 2002/0026397 A1 * | 2/2002 | Ieta et al. | 705/35 |
| 2002/0026424 A1 * | 2/2002 | Akashi | 705/57 |
| 2003/0071927 A1 * | 4/2003 | Park et al. | 348/734 |

* cited by examiner

| NAMES OF DATA | VALUES |
|---|---|
| DEVICE ID TO BE RECOVERED | DFYAAD9323Y3KAP |
| CURRENT DEVICE ID | GD4Y3U9QEBVBQCA |

FIG. 6

| NAMES OF DATA | VALUES |
|---|---|
| USER IDENTIFICATION ID | KATSUHIKO SATOU |
| AUTHENTICATION PASSWORD | YZ82DF3CED |
| DEVICE ID TO BE RECOVERED | DFYAAD9323Y3KAP |
| CURRENT DEVICE ID | GD4Y3U9QEBVBQCA |

FIG. 7

| USER IDENTIFICATION ID | AUTHENTICATION PASSWORD | DEVICE ID |
|---|---|---|
| 23EDYAPGGW349 | Gxsi7ksa3z | 4DE928AHJFDBV |
| GTP4D49CXLP4D | ikk1lch1Y | THEDABAPVC942 |
| DNB83HD9LACE2 | Gas1NSy0Ten | KA2HKSAT449BD |

| NAMES OF DATA | VALUES |
|---|---|
| USER IDENTIFICATION ID | DIE8DF8AS |
| AUTHENTICATION PASSWORD | YZ82DF3CED |
| DEVICE ID TO BE RECOVERED | DFYAAD9323Y3KAP |

| IF DEVICE ID HAS NOT BEEN REGISTERED | IF DEVICE ID HAS ALREADY BEEN REGISTERED |
|---|---|
| USER IDENTIFICATION ID | USER IDENTIFICATION ID |
| AUTHENTICATION PASSWORD | AUTHENTICATION PASSWORD |
|  | ID RECOVERY PROGRAM |

| NAMES OF DATA | VALUES |
|---|---|
| USER IDENTIFICATION ID | KATSUHIKO SATOU |
| AUTHENTICATION PASSWORD | YZ82DF3CED |
| CURRENT DEVICE ID | GD4Y3U9QEBVBQCA |

| NAMES OF DATA | VALUES |
|---|---|
| USER IDENTIFICATION ID | DIE8DF8AS |
| AUTHENTICATION PASSWORD | YZ82DF3CED |

COMMUNICATION SYSTEM, TERMINAL DEVICE, REPRODUCTION PROGRAM, STORAGE MEDIUM STORING THE REPRODUCTION PROGRAM, SERVER MACHINE, SERVER PROGRAM, AND STORAGE MEDIUM STORING THE SERVER PROGRAM

TECHNICAL FIELD

The present invention relates to a communication system including a terminal device for reproducing digital contents controlled in accordance with a device ID and a server machine connected to the terminal device via a communication network.

BACKGROUND ART

In recent years, the contents of music, visual images, books, etc. which are converted to digital data, i.e. digital contents have been in widespread use through various storage media and communication links such as the Internet. In connection with this, copyright infringements such as unauthorized copying have also increased since the digital contents are, as digital data, not deteriorated through copying.

To prevent the unauthorized copying of digital contents, there is a known method of prevention by including a flag which indicates prohibition/permission of copying in the data. However, this method has such defects that an apparatus which can ignore flags enables to carry out unauthorized copying, and the users are disallowed to produce the backup copies of personally possessing data.

To eliminate these defects, for instance, Japanese Laid-Open Patent Application No. 11-272565/1999 (Tokukaihei 11-272565; published on Oct. 8, 1999) discloses a technique to control the reproduction of digital contents using IDs uniquely assigned to respective devices for reproducing the digital contents. With this technique, a digital content includes a device ID which specifies the device permitted to reproduce the digital content, and a device for reproducing the digital content reads out the device ID of the digital content so that the reproduction of the digital content is carried out only when the device ID which has been read out corresponds to the device ID of the device.

According to this technique, it is possible to prevent unauthorized copying in the following manner: When, for instance, purchasing a digital content from a content sales server on the Internet, a customer notifies the device ID of his/her own device to the content sales server along with the content that he/she wants, thereby purchasing the content by downloading the same. The digital content that has been purchased in this way includes a device ID. Thus if he/she copies the content and gives it to a friend, the reproduction of the copied content is not allowed in the device of the friend. In this wise, even if one produces the unauthorized copy of a digital content, the copied content can only be reproduced in his/her own device and hence unauthorized copying is practically prevented.

Now, considering the case to realize the technique of Japanese Laid-Open Patent Application No. 11-272565/1999 as software for general-purpose computers, in order to avoid the overlapping of device IDs between devices, device IDs are determined using information unique to the respective computers. When a computer does not store any information unique to the same or the information unique to the computer is not available, there is such a conceivable option that a device ID is determined by generating random numbers on the occasion of installing the software.

However, when, for instance, the OS (Operating System) or the content player of a computer is out of order, it may be necessary to reinstall the software. If the OS or the content player is reinstalled, another device ID is determined and consequently the computer is no longer allowed to reproduce the digital contents that have previously been purchased.

The present invention is worked out to solve the foregoing problem, so that the objective of the present invention is to provide a communication system, a terminal device, a reproduction program, a storage medium storing the reproduction program, a server machine, a server program, and a storage medium storing the server program, by which a device ID based on which the terminal device reproduces digital contents can be recovered, when the device ID is altered due to reasons such as the anomaly of the device.

DISCLOSURE OF THE INVENTION

To solve the foregoing problem, a communication system in accordance with the present invention, which comprises: a terminal device including reproduction means which carries out reproduction of a digital content; and a server machine which is connected to the terminal device via a communication link and includes program generation means for generating a device ID alteration program by which a device ID of the terminal device is altered, is characterized in that: the reproduction means includes ID setting means for setting a device ID corresponding to the terminal device; the digital content is reproduced only when a device ID included in the digital content corresponds to a device ID of a device by which it is intended to reproduce the digital content; when the device ID alteration program is supplied from the server machine, the device ID of the terminal device is altered in accordance with the device ID alteration program; and when the server machine receives a request to alter the device ID from the terminal device, the device ID alteration program is sent to the terminal device.

According to this arrangement, the terminal device is provided with the ID setting means for setting the device ID, and on the occasion of reproducing a digital content, the reproduction is allowed only when, for instance, a device ID which is assigned at the time of purchasing the digital content corresponds to the device ID of a device by which it is intended to reproduce the digital content. In this case, when the OS is reinstalled in the terminal device, the device ID is altered and consequently the computer is no longer allowed to reproduce the digital contents with a previous device ID. With the arrangement above, by receiving the device ID alteration program from the server machine and starting the program, it is possible, for instance, to re-obtain the previous device ID on the side of the terminal device. Thus, the arrangement makes it possible to recover the device ID on the side of the terminal device, thereby reproducing the digital contents which have previously been obtained, without any problem.

A terminal device in accordance with the present invention, comprising reproduction means for reproducing a digital content, is characterized in that, the reproduction means includes: ID setting means for setting a device ID corresponding to the terminal device; and communication means for receiving a device ID alteration program, which is for altering the device ID and is generated by program generation means of a server machine, from the server machine via a communication link, the reproduction means reproduces the digital content only when a device ID included in the digital content corresponds to a device ID of a device by which it is intended to reproduce the digital content, and when the device ID alteration program is supplied from the server machine, the device ID of the terminal device is altered in accordance with the device ID alteration program.

According to this arrangement, the terminal device is provided with the ID setting means for setting the device ID, and on the occasion of reproducing a digital content, the reproduction is allowed only when, for instance, a device ID which is assigned at the time of purchasing the digital content corresponds to the device ID of a device by which it is intended to reproduce the digital content. In this case, when the OS is reinstalled in the terminal device, the device ID is altered and consequently the computer is no longer allowed to reproduce the digital contents with a previous device ID. With the arrangement above, by receiving the device ID alteration program from the server machine and starting the program, it is possible, for instance, to re-obtain the previous device ID on the side of the terminal device. Thus, the arrangement makes it possible to recover the device ID on the side of the terminal device, thereby reproducing the digital contents which have previously been obtained, without any problem.

A server machine in accordance with the present invention, which is connected to a terminal device including reproduction means for reproducing a digital content, via a communication link, and includes: program generation means for generating a device ID alteration program by which a device ID of the terminal device is altered; and communication means which carries out data transmission with the terminal device, is characterized in that: the reproduction means (i) sets a device ID corresponding the terminal device, (ii) reproduces the digital content only when a device ID included in the digital content corresponds to a device ID of a device by which it is intended to reproduce the digital content, and (iii) when the device ID alteration program is supplied from the server machine, alters the device ID of the terminal device in accordance with the device ID alteration program; and when the communication means receives a request to alter the device ID from the terminal device, the device ID alteration program is sent to the terminal device.

According to this arrangement, the reproduction means of the terminal device sets the device ID, and the reproduction is allowed only when, for instance, a device ID which is assigned at the time of purchasing the digital content corresponds to the device ID of a device by which it is intended to reproduce the digital content. In this case, when the OS is reinstalled in the terminal device, the device ID is altered and consequently the computer is no longer allowed to reproduce the digital contents with a previous device ID. With the arrangement above, since the server machine sends the device ID alteration program to the terminal device, it is possible, for instance, to obtain the previous device ID again, by starting the received device ID alteration program in the terminal device. Thus, the arrangement makes it possible to recover the device ID on the side of the terminal device, thereby reproducing the digital contents which have previously been obtained, without any problem.

For a fuller understanding of the nature of the invention, reference should be made to the ensuing detailed description taken in conjunction with the accompanying drawing.

BRIEF DESCRIPTION OF THE DRAWINGS

FIG. 6 illustrates the content of data which is supplied to a recovery program generation server by communication means of a general-purpose computer.

FIG. 7 illustrates an example of the information stored in a customer information management database of the recovery program generation server.

BEST MODES FOR CARRYING OUT THE INVENTION

The present invention will be described in detail with reference to examples and comparative examples. Note that, the present invention is not at all limited to these examples.

Embodiment 1

An embodiment of the present invention will be described as below in reference to figures.

Figures 1, 2:
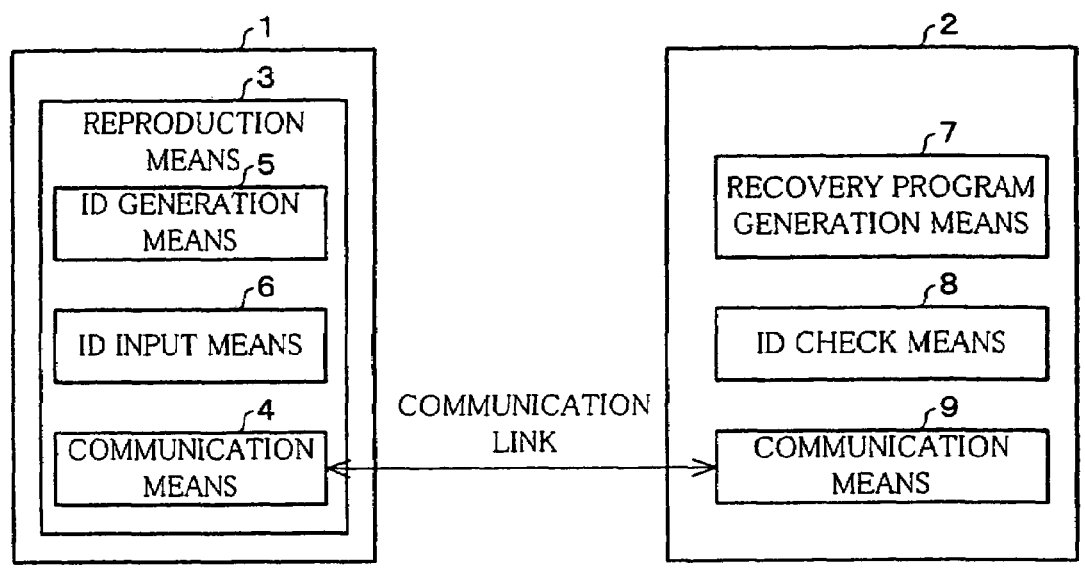
FIG. 1 is a block diagram, briefly illustrating an arrangement of a communication system in accordance with an embodiment of the present invention.
FIG. 2 illustrates the content of data which is supplied to a recovery program generation server by communication means of a general-purpose computer.

FIG. 1 is a block diagram, briefly illustrating an arrangement of a communication system in accordance with an embodiment of the present invention. This communication system includes a general-purpose computer (terminal device) 1 and a recovery program generation server (server machine) 2. The general-purpose computer 1 is connected to the recovery program generation server 2 via a communication link such as the Internet and hence it is possible to carry out the two-way transmission of data between these two members. Although FIG. 1 illustrates only one general-purpose computer 1, a plurality of general-purpose computers 1 may be connected to the recovery program generation server 2. Moreover, a plurality of recovery program generation servers 2 may be provided.

The general-purpose computer 1 is composed of a typical computer such as a PC (Personal Computer). That is to say, although no illustration is provided, the general-purpose computer 1 is composed of (i) a computer with members such as: a CPU (Central Processing Unit); a RAM (Random Access Memory) as a main storage device; a ROM (Read Only Memory) for storing programs such as the BIOS (Basic Input/Output System); a hard disk for storing various programs and sets of data; a keyboard and a mouse as input means; communication devices such as a modem and a TA (Terminal Adapter), for data communication with other computers via the communication link, and (ii) a display device as display means, etc.

As illustrates in FIG. 1, the general-purpose computer 1 includes reproduction means 3. The reproduction means 3 is realized by an electronic book reproduction program operating on the general-purpose computer 1, along with the following means included in the reproduction means 3. The electronic book reproduction program is a program for displaying electronic book data, which is the data of novels, cartoons, newspapers, and magazines being digitized, on a display device in a viewable form.

The electronic book reproduction program is installed in the storage medium of the general-purpose computer 1, such as a hard disk. There are several ways of installing the electronic book reproduction program into the general-purpose computer 1, e.g. reading out the program from the storage medium in which the program is stored, and downloading a compressed file of the program via a communication link.

When the user obtains the digital data to be reproduced by the electronic book reproduction program, the device ID of the general-purpose computer 1 owned by the user has been incorporated into the digital data. Thus, the reproduction of the purchased digital data is disallowed or limited if a device for reproducing the data is not the device with the device ID which has been incorporated into the digital data, i.e. the device which has been specified on the occasion of purchasing the data.

The present embodiment illustrates an example that the reproduction means 3 is realized by the electronic book reproduction program. However, the program may be a program for reproducing other kinds of digital contents, such as music and video.

The reproduction means 3 includes ID generation means (ID setting means), ID input means 6, and communication means 4. The ID generation means 5 is means for generating a device ID by generating random numbers, on the occasion of installing the electronic book reproduction program into the general-purpose computer 1. This device ID is arranged as a character string which satisfies predetermined conditions, in order to prevent the unauthorized generation thereof. For instance, the following conditions are determined: The character string of the device ID is fixed to 15 characters, and the first 14 characters are generated as random numbers according to the information unique to the general-purpose computer, while the last character is determined by the calculation of the first 14 characters.

The ID input means 6 is means for inputting a device ID to be recovered, on the occasion of the process of recovering the device ID. This process will be described later. The input to the input means 6 is typically carried out using a keyboard or by sending the data stored in a storage medium such as an FD (Floppy® Disc).

The communication means 4 carries out the two-way transmission of data with the recovery program generation server 2 via the communication link, on the occasion of the process of recovering the device ID. More specifically, the data to be sent to the recovery program generation server 2 by the communication means 4 is, as FIG. 2 illustrates, composed of a current device ID which has been generated by the ID generation means 5 and a device ID to be recovered, which has been inputted through the ID input means 6. The data transmission between the communication means 4 and the recovery program generation server 2 may be encrypted, considering the security.

In the present embodiment, the data transmission between the communication means 4 and the recovery program generation server 2 is carried out via a communication link. However, the data transmission may be carried out using an external storage device and a storage medium such as an FD.

The recovery program generation server 2 is composed of a computer which operates as a server on a communication link such as the Internet. For instance, although no illustration is provided, the recovery program generation server 2 composed of a PC is constituted by (i) a computer including members such as: a CPU; a RAM as a main storage device; a ROM for storing programs such as the BIOS; a hard disk for storing various programs and sets of data; a keyboard and a mouse as input means used on the occasion of maintenance, (ii) a communication devices such as a router, for data communication with other computers via a communication link, and (iii) a display device as display means, etc.

This recovery program generation server 2 is, as FIG. 1 illustrates, provided with recovery program generation means (program generation means) 7, ID check means 8, and communication means 9. These means are realized by the programs installed in the recovery program generation server 2. There are several ways of installing these programs into the recovery program generation server 2, e.g. reading out the program from the storage medium in which the program is stored, and downloading a compressed file of the program via the communication link.

The communication means 9 is means for carrying out the two-way transmission of data with the general-purpose computer 1 via the communication link, on the occasion of the process of recovering the device ID. The ID check means 8 is means for checking whether or not the information of the device ID transmitted from the general-purpose computer 1 by the communication means 9 satisfies the predetermined conditions of device ID generation. The recovery program generation means 7 is means for generating a recovery program (device ID alteration program) which enables the reproduction means 3 of the general-purpose computer 1 to set a device ID to be recovered, the device ID being sent from the general-purpose computer 1 by the communication means 9, as a current device ID.

Figure 3:
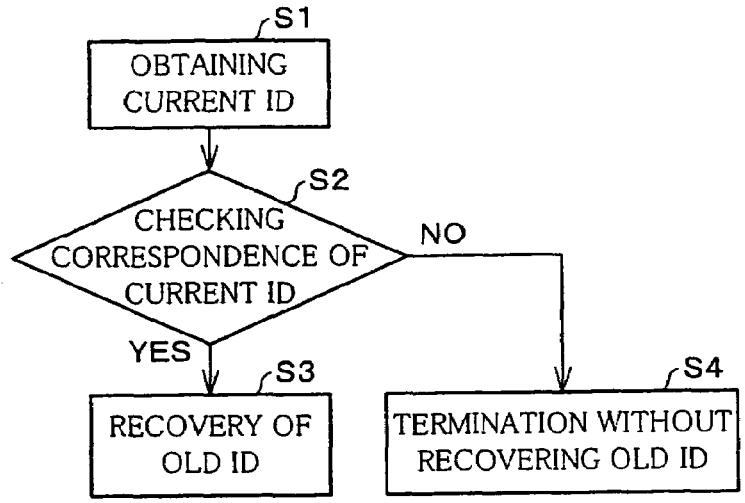
FIG. 3 is a flow chart, illustrating the steps of processing that reproduction means alters a device ID using a recovery program.

Now, in reference to the flow chart in FIG. 3, the following will describe the steps of processing that the reproduction means 3 alters the device ID with the help of the recovery program. First, the reproduction means 3 of the general-purpose computer 1 obtains a device ID which has currently been determined, i.e. a current ID (Step 1: hereinafter, "Step" will be referred to as "S"). Then it is judged whether or not a current ID in the recovery program which has been received from the recovery program generation server 2 corresponds to the current ID which has been obtained in S1 (S2).

If the judgment in S2 is YES, i.e. if it is judged that the current ID in the recovery program corresponds to the current ID obtained in S1, the current device ID is replaced with a device ID which is wanted to be recovered and is included in the recovery program, i.e. the current ID is replaced with an old ID (S3). In contrast, if the judgment in S2 is NO, i.e. the current ID in the recovery program does not correspond to the current ID obtained in S1, it is judged that the device to which the user is trying to set the old device ID is inappropriate, so that the process is terminated without carrying out the processing of recovering the device ID (S4).

Figure 4:
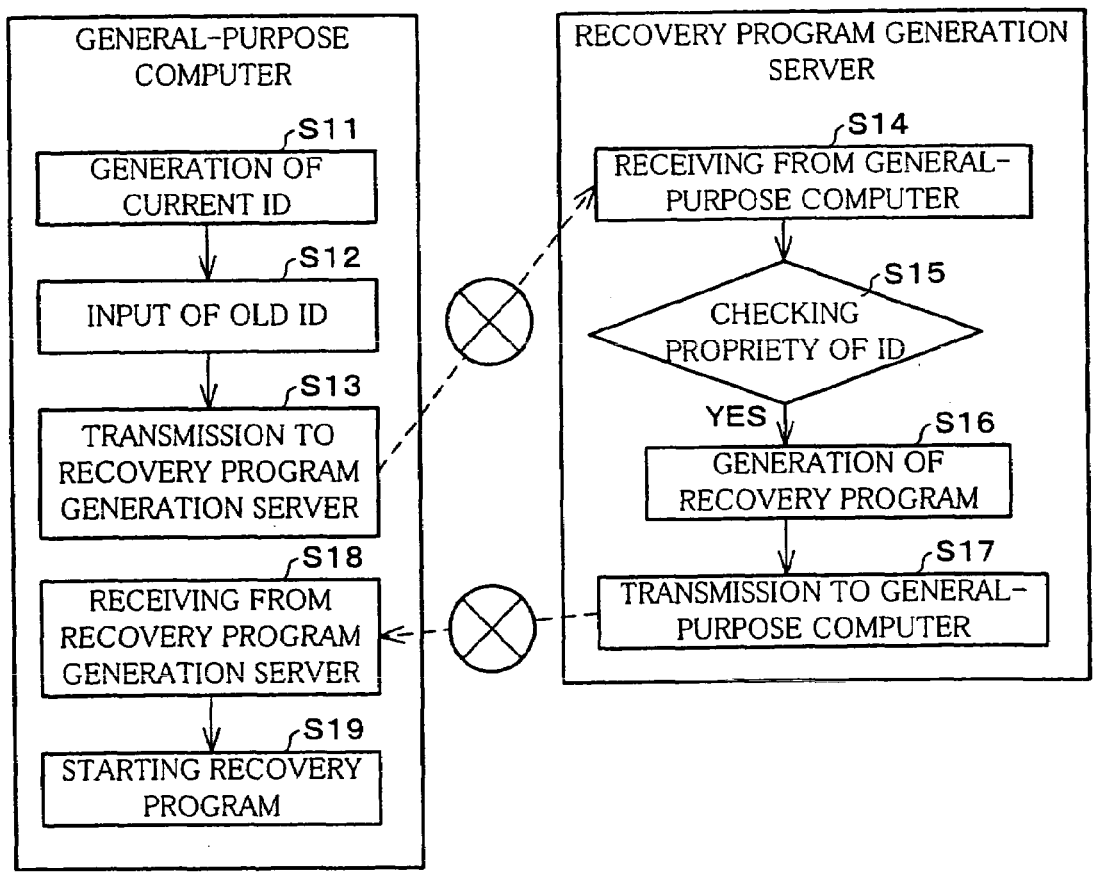
FIG. 4 is a flow chart, illustrating the steps of processing that the device ID of the general-purpose computer is renewed in the arrangement of FIG. 1.

Next, in reference to the flow chart in FIG. 4, the following will describe the steps of processing to renew the device ID of the general-purpose computer 1 of the communication system illustrated in FIG. 1. Note that, the flow chart of FIG. 4 indicates that the processing in S11-S13 and in S18-S19 is carried out on the side of the general-purpose computer 1, while the processing in S14-17 is carried out on the side of the recovery program generation server 2.

First, assume that a general-purpose computer 1 to which the electric book reproduction program has been installed has become out of order for some reasons, so that the OS or the electronic book reproduction program of the general-purpose computer 1 is reinstalled, or another general-purpose computer 1 is purchased in place of the old one. In this case, it is necessary to install the electric book reproduction program to the general-purpose computer 1 again. Then either in the course of the process of installing or on the occasion of starting the installed electronic book reproduction program for the first time, the ID generation means 5 freshly generates a device ID (S11), and this device ID is determined as a current device ID (current ID).

Then using the ID input means 6, a device ID (old ID) before the reinstallation of the OS, which has been noted by hand or has been stored in an FD, etc., is inputted (S12). Subsequently, the communication means 4 sends the data illustrated in FIG. 2, i.e. both the old ID and the current ID, to the recovery program generation server 2 (S13). Here, if the recovery program generation server 2 doubles as a server for selling digital contents, an accounting ID and a password thereof which are used on the occasion of purchasing digital contents are also sent from the communication means 4 to the recovery program generation server 2.

On the side of the recovery program generation server 2, the communication means 9 receives the data which has been sent from the general-purpose computer 1 in S13 (S14). Then the old ID is retrieved from the received data and the ID check means 8 checks whether the old ID is proper or not (S15). If the ID is judged as proper (judged as YES in S15), the recovery program generation means 7 generates a recovery program for replacing the current device ID (current ID) with the device ID to be recovered (old ID) (S16). In contrast, when the ID is judged as improper in S15, the processing is suspended and the impropriety of the ID is notified to the general-purpose computer 1. If the recovery program is generated in S16, the recovery program is transmitted towards the general-purpose computer 1 by the communication means 9 (S17).

On the side of the general-purpose computer 1, the communication means 4 receives the recovery program which has been transmitted from the recovery program generation server 2 in S17 (S18). Then in S19, the recovery program starts so that the renewal of the device ID is conducted in accordance with the aforementioned processing described with reference to FIG. 3.

As in the foregoing description, the communication system in accordance with the present embodiment is arranged in such a manner that the general-purpose computer 1 is provided with the ID generation means 5 for determining a device ID, and the reproduction of a digital content is allowed only when, for instance, a device ID determined on the occasion of purchasing the digital content corresponds to a device ID assigned to the device by which the reproduction is intended to be carried out. This arrangement has conventionally caused such a defect that, when, for instance, the reinstallation of the OS is carried out in the general-purpose computer 1, the device ID is altered so that the digital content with a previous device ID is not allowed to be reproduced. However, with the foregoing communication system, it is possible to recover, for instance, the previous device ID by sending the recovery program from the recovery program generation server 2 to the general-purpose computer 1, thereby starting the program. Thus, this makes it possible to recover the device ID on the side of the general-purpose computer 1, and reproduce digital contents that have previously been obtained, without any problems.

Further, on the side of the general-purpose computer 1, the reproduction means 3 transmits a current device ID and a device ID to be recovered, towards the recovery program generation server 2. Then on the side of the recovery program generation server 2, the ID check means 8 checks whether the received device ID to be recovered is proper or not. Subsequently the recovery program for replacing the current device ID with the device ID to be recovered is generated, so as to be supplied to the general-purpose computer 1. Thus, since the transmission of the recovery program is carried out after the propriety of the received device ID is checked by the ID check means 8, it is possible to prevent the use of improper IDs, and this ensures the copyright protection of digital contents.

Embodiment 2

Referring to figures, the following will describe another embodiment of the present invention. By the way, members having the same functions as those described in Embodiment 1 are given the same numbers, so that the descriptions are omitted for the sake of convenience.

Figure 5:
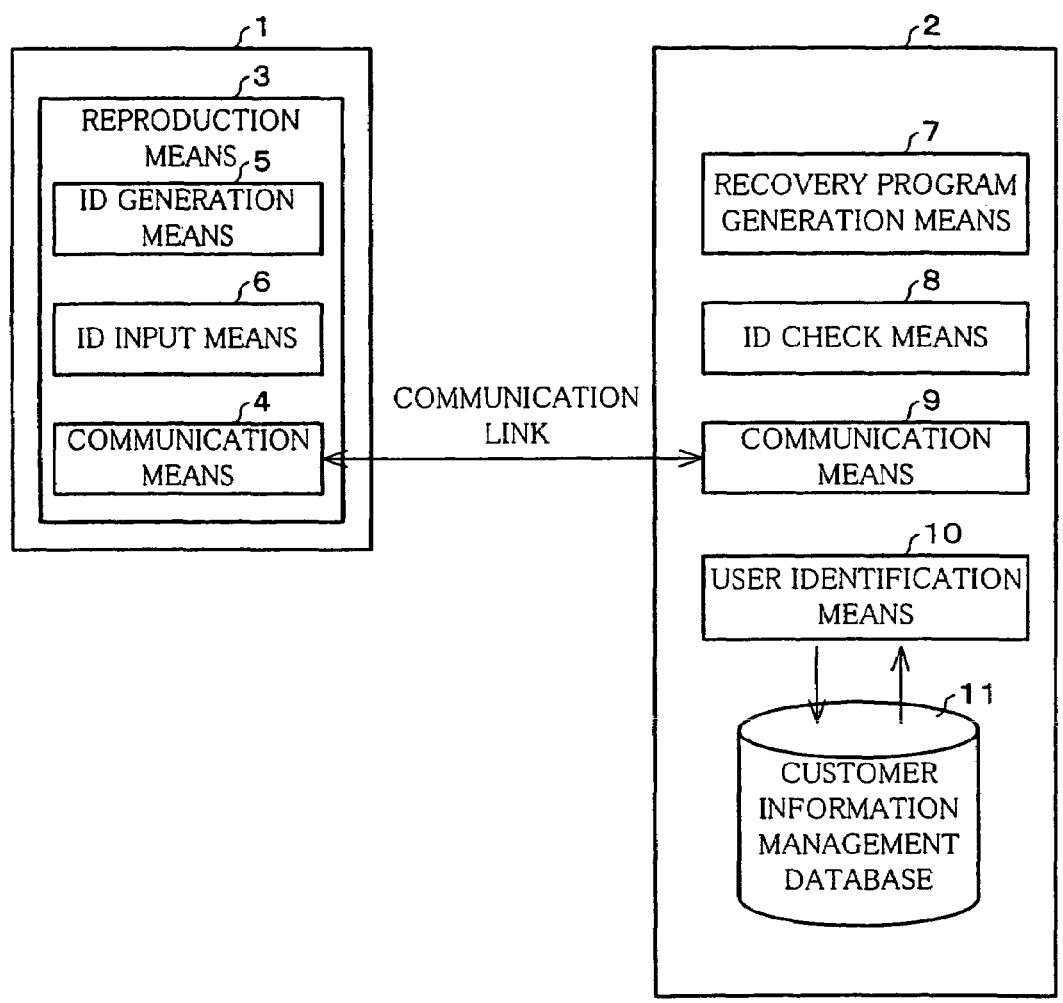
FIG. 5 is a block diagram, briefly illustrating an arrangement of a communication system in accordance with another embodiment of the present invention.

FIG. 5 is a block diagram, briefly illustrating an arrangement of a communication system in accordance with the present embodiment. Compared to the arrangement in FIG. 1, the recovery program generation server 2 is differently composed in the communication system in accordance with the present embodiment. Thus, since the composition of the general-purpose computer 1 is identical with the same in Embodiment 1, the descriptions thereof are omitted here.

It is noted that, in the present embodiment, the content of data supplied from a communication means 4 of a general-purpose computer 1 to a recovery program generation server 2 is different from the content of the data in Embodiment 1. As illustrated in FIG. 6, the data supplied towards the recovery program generation server 2 using the communication means 4 is constituted by: a user identification ID assigned to each of users who are formally registered to the recovery program generation server 2; an authentication password corresponding to the user identification ID; a current device ID generated by ID generation means 5; and a device ID which is desired to be recovered and has been inputted through an ID input means 6. Also in the present embodiment, the data transmission between the communication means 4 and the recovery program generation server 2 may be encrypted, considering the security.

Moreover, in the present embodiment, the data transmission between the communication means 4 and the recovery program generation server 2 is carried out via a communication link. However, as in the foregoing embodiment, the data transmission may be carried out using an external storage device and a storage medium such as an FD.

Being identical with the arrangement in Embodiment 1, the recovery program generation server 2 is constituted by a computer which operates as a server on a communication link such as the Internet. As FIG. 5 illustrates, the recovery program generation server 2 is provided with a recovery program generation means 7, an ID check means 8, a communication means 9, a user identification means 10, and a customer information management database 11. The descriptions of the recovery program generation means 7, the ID check means 8, and the communication means 9 are omitted here, since these members are identical with those described in Embodiment 1.

The user identification means 10 is means for judging whether or not a user identification ID and an authentication password received from the general-purpose computer 1 by the communication means 9 are formally registered, in reference to the customer information management database 11. The customer information management database 11 is a database of the information of user identification IDs, authentication passwords, and device IDs of users who are formally registered to the recovery program generation server 2. This customer information management database 11 is stored in storage means such as a hard disk in the recovery program generation server 2. FIG. 7 illustrates an example of the information constituting the customer information management database 11.

Next, referring to the flow chart in FIG. 8, the steps of processing to renew the device ID of the general-purpose computer 1 in the communication system in FIG. 5 will be described as below. Note that, in the flow chart in FIG. 8, the processing in S21-S23 and S29-S30 is carried out on the side of the general-purpose computer 1 while the processing in S24-S28 is carried out on the side of the recovery program generation server 2.

First, in the processing of S21 and S22, actions such as the reinstall of an electronic book reproduction program, the determination of a new device ID (current ID), and the input of a device ID to be recovered (old ID), etc. are carried out. Since these steps are identical with S11 and S12 which have been illustrated in Embodiment 1 in reference to FIG. 4, the detailed descriptions thereof are omitted here.

Then by the communication means 4, the data illustrated in FIG. 6, i.e. the data of a user identification ID, an authentication password, a device ID to be recovered (old ID), and a device ID which has currently been used (current ID), is transmitted to the recovery program generation server 2 (S23).

On the side of the recovery program generation server 2, the communication means 9 receives the data which has been sent from the general-purpose computer 1 in S23 (S24). Then the user identification ID and the authentication password are retrieved from the received data, and the user identification means 10 judges whether or not the user is an authorized user, in reference to the customer information management database (S25). If it is judged that the user is not an authorized user, the processing is suspended and the incompletion of the user authentication is notified to the general-purpose computer 1.

If the user is identified as an authorized user in S25, the old ID is retrieved from the received data so that the ID check means 8 checks whether or not the old ID is proper (S26). If the ID is proper (YES in S26), the recovery program generation means 7 generates a recovery program which replaces the current device ID with the device ID to be recovered, i.e. the program replaces the current ID with the old ID (S27). In contrast, if the old ID is judged as improper, the processing is suspended and the impropriety of the ID is notified to the general-purpose computer 1. Provided that the recovery program is generated in S27, the recovery program is sent towards the general-purpose computer 1 by the communication means 9 (S28).

On the side of the general-purpose computer 1, the communication means 4 receives the recovery program which has been sent from the recovery program generation server 2 in S28 (S29). Then in S30, the recovery program starts so that the renewal of the device ID is conducted in accordance with the aforementioned processing described in Embodiment 1 with reference to FIG. 3.

As described above, the communication system in accordance with the present embodiment is arranged in such a manner that, on the side of the general-purpose computer 1, the reproduction means 3 sends a user identification ID, an authentication password, a current device ID, and a device ID to be recovered, towards the recovery program generation server 2. Then in the recovery program generation server 2, the ID check means 8 checks the propriety of the received device ID, and the user identification means 10 judges whether or not the user is a formally registered user, in reference to the customer information management database 11. As a result, a recovery program for replacing the received current device ID with the device ID to be recovered is generated, so as to be sent to the general-purpose computer 1. Thus, since the transmission of the recovery program is carried out after the ID check means 8 certifies the propriety of the received device ID and the user identification means 10 certifies the user registration, only proper users who have been formally registered are allowed to alter the device ID, and hence it is possible to prevent the improper alteration of device IDs and this ensures the copyright protection of digital contents.

Embodiment 3

Referring to figures, the following will describe a further embodiment of the present invention. By the way, members having the same functions as those described in the foregoing embodiments are given the same numbers, so that the descriptions are omitted for the sake of convenience.

In Embodiments 1 and 2, the recovery program supplied from the recovery program generation server 2 to the general-purpose computer 1 is a program for replacing a current device ID with a device ID which is desired to be recovered. In doing so, both the current device ID and the device ID to be recovered are sent from the general-purpose computer 1, so that the recovery program for replacing the current device ID with the device ID to be recovered is generated on the side of the recovery program generation server 2. In contrast, in the present embodiment, the recovery program is a program for replacing a current device ID with a device ID which is desired to be recovered, regardless of the authenticity of the current device ID.

That is to say, comparing the systems described in respective Embodiments 1 and 2, in the present embodiment, the current device ID is omitted from the data to be sent from the general-purpose computer 1 to the recovery program generation server 2. In other words, comparing to Embodiment 1, the data to be sent from the general-purpose computer 1 to the recovery program generation server 2 in the present embodiment is only a device ID to be recovered. Comparing to Embodiment 2, the data to be sent from the general-purpose computer 1 to the recovery program generation server 2 in the present embodiment is, as FIG. 9 illustrates, a user identification ID, an authentication password, and a device ID to be recovered.

Moreover, recovery program generation means 7 of the recovery program generation server 2 generates a recovery program for replacing a current device ID with a device ID to be recovered, in reference to the received device ID to be recovered. Then the general-purpose computer 1 receives this recovery program, and without the step of judging whether or not the current ID corresponds to a current ID of the recovery program as illustrated in the flow chart in FIG. 3 (S2), the step of the recovery of an old ID (S3) is carried out.

The processing other than the above is identical with those in Embodiments 1 and 2 so that the descriptions thereof are omitted here.

As described above, the communication system in accordance with the present embodiment is arranged in such a manner that, on the side of the general-purpose computer 1, the reproduction means 3 sends a user identification ID, an authentication password, and a device ID to be recovered, towards the recovery program generation server 2, then on the side of the recovery program generation server 2, the user identification means 10 judges whether or not the user is a formally registered user, in reference to the customer information management database 11, and subsequently a recovery program, which alters a current device ID to the device ID to be recovered, regardless of the authenticity of the current device ID, is generated, so as to be sent to the general-purpose computer 1. Thus, since the transmission of the recovery program is carried out after the user identification means 10 certifies the user registration, only users who have been formally registered are allowed to alter the device ID, and hence it is possible to prevent the improper alteration of device IDs and this ensures the copyright protection of digital contents.

With this arrangement, since the propriety of the user is judged in reference to the user identification ID and the authentication password, it is unnecessary to send the current device ID from the general-purpose computer 1 to the recovery program generation server 2. On this account, it is possible to reduce the amount of data to be sent from the general-purpose computer 1 to the recovery program generation server 2.

Moreover, since the recovery program alters a current device ID to a device ID to be recovered, regardless of the authenticity of the current device ID, if the recovery program is stored in the general-purpose computer 1, it is possible to recover the device ID on the occasion of the reinstall of an OS and a content player again, using this stored recovery program. Thus, this arrangement makes it unnecessary to send the recovery program from the recovery program generation server 2 again.

Embodiment 4

Referring to figures, the following will describe yet another embodiment of the present invention. By the way, members having the same functions as those described in the foregoing embodiments are given the same numbers, so that the descriptions are omitted for the sake of convenience.

Figure 10:
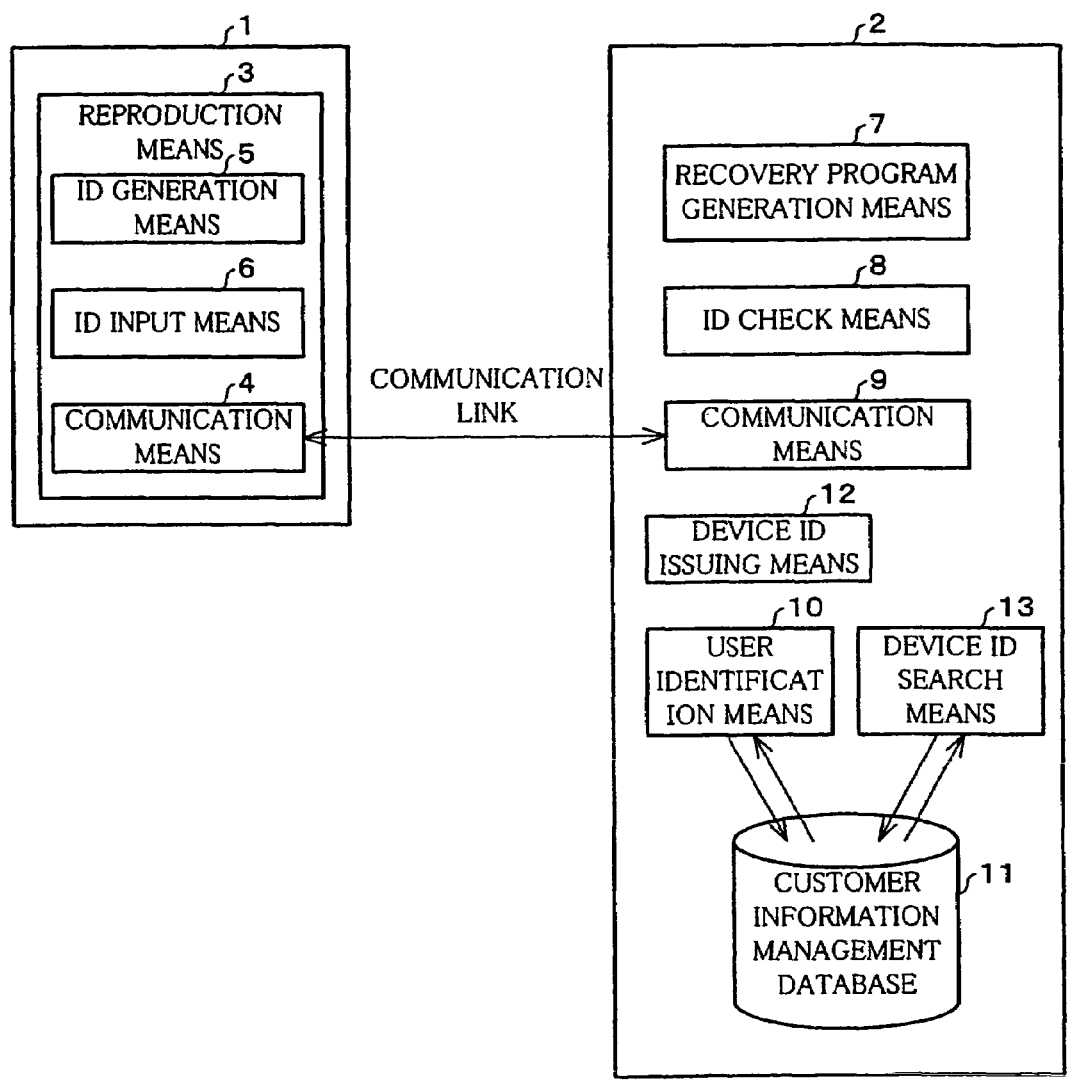
FIG. 10 is a block diagram, briefly illustrating an arrangement of the communication system in accordance with yet another embodiment of the present invention.

FIG. 10 is a block diagram, briefly illustrating an arrangement of a communication system in accordance with the present embodiment. Comparing to the arrangement of Embodiment 2 illustrated in FIG. 5, a recovery program generation server 2 is differently arranged in the communication system of the present embodiment. Thus, the arrangement of a general-purpose computer 1 is identical with those in Embodiments 1 and 2 so that the descriptions thereof are omitted here.

In Embodiment 2, the customer information management database 11 manages the user identification ID and the device ID, but no system for checking whether or not another user has registered an identical device ID is provided. Thus, the present embodiment further includes such an arrangement that a device ID which is newly generated is promptly registered to a customer information management database 11.

A recovery program generation server 2 is, as in Embodiments 1 and 2, composed of a computer which operates as a server on a communication link such as the Internet. As FIG. 10 illustrates, this recovery program generation server 2 includes a recovery program generation means 7, an ID check means 8, a communication means 9, a user identification means 10, a customer information management database 11, a device ID issuing means 12, and a device ID search means 13. The recovery program generation means 7, the ID check means 8, the communication means 9, the user identification means 10, and the customer information management database 11 are arranged so as to be identical with those in Embodiments 1 and 2, and hence the descriptions thereof are omitted here.

The device ID search means 13 is means for checking device IDs registered in the customer information management database 11 in order to find a corresponding device ID therein. The device ID issuing means 12 is means for generating an authentic device ID which has not been registered in the customer information management database 11.

Figures 11, 12:
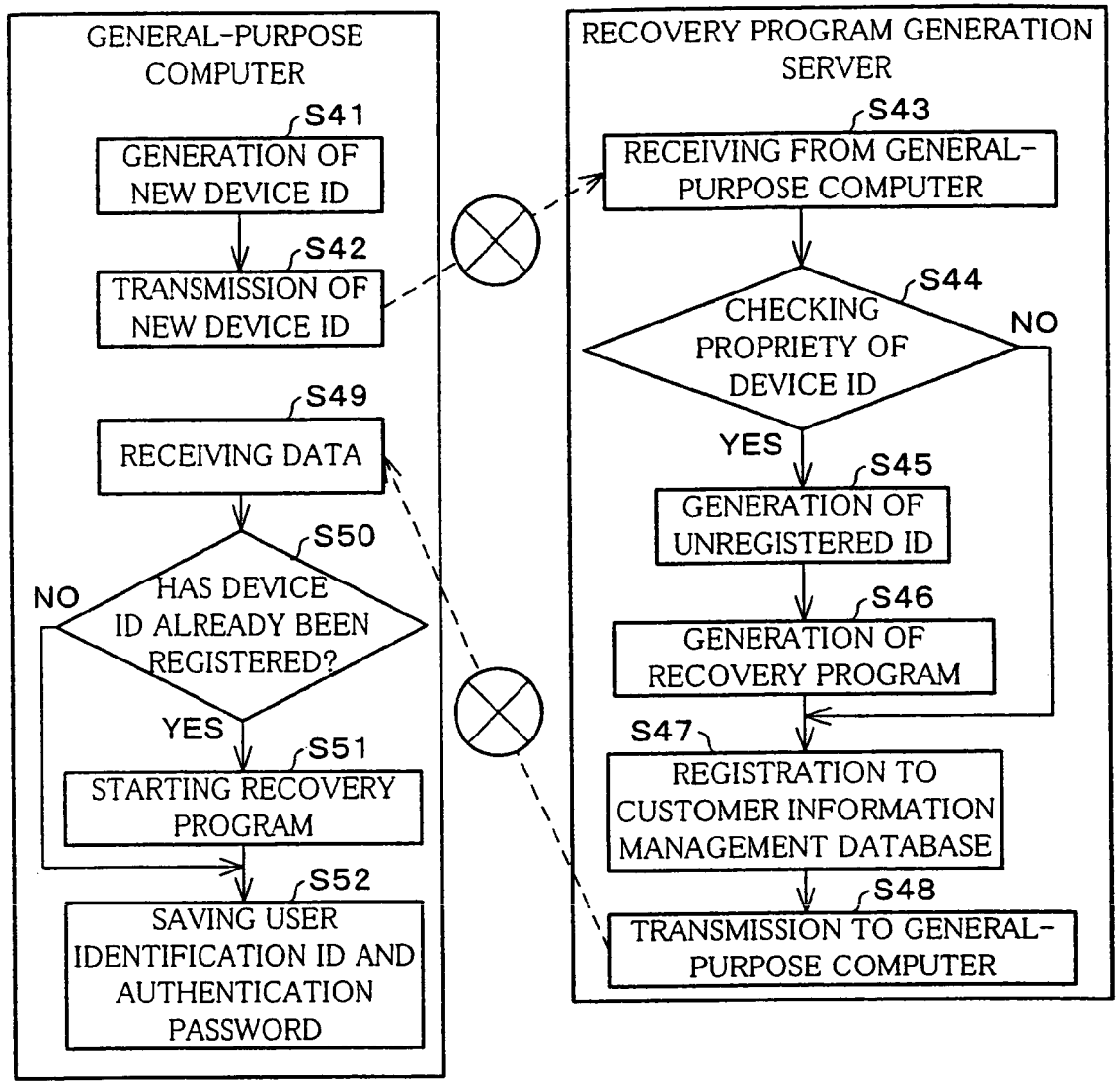
FIG. 11 is a flow chart, illustrating the steps of processing to carry out the initial registration of a device ID in the arrangement of FIG. 10.
FIG. 12 illustrates the content of data which is supplied from a recovery program generation server to a general-purpose computer, either when a device ID has already been registered or when a device ID has not been registered yet.

Now, referring to the flow chart in FIG. 11, the following will discuss the steps of processing to carry out the initial registration of a device ID in the communication system illustrated in FIG. 10. Note that, the flow chart of FIG. 11 indicates that the processing in S41-S42 and in S49-S52 is carried out on the side of the general-purpose computer 1, while the processing in S43-48 is carried out on the side of the recovery program generation server 2.

First, an electric book reproduction program is freshly installed into the general-purpose computer 1, and in response to this, a device ID is newly generated (S41). Then this newly generated device ID is transmitted towards the recovery program generation server 2 by the communication means 4 (S42).

On the side of the recovery program generation server 2, the communication means 9 receives the new device ID which has been sent from the general-purpose computer 1 in S42 (S43). Subsequently, the device ID search means 13 checks whether or not the device IDs which have already been registered in the customer information management database 11 include a device ID identical with the received device ID (S44).

If the received device ID has already been registered (YES in S44), the device ID issuing means 12 generates a device ID which has not been registered in the customer information management database 11 (S45). Then the recovery program generation means 7 generates a recovery program by which the received device ID is replaced with the device ID which has been generated by the device ID issuing means 12 (S46).

If the judgment in S44 is NO, i.e. if no device ID corresponding to the received device ID, is found among the device IDs having been registered in the customer information management database 11, or if the process in S46 is finished, a user identification ID and an authentication password are issued for the user, and the ID and the password are registered in the customer information management database 11, along with the determined device ID (S47). Here, the authentication password may be determined on the side of the recovery program generation server 2, or the user may determine an arbitrary password on the side of the general-purpose computer 1.

Thereafter, as illustrated in FIG. 12, if it is judged in S44 that the device ID has already been registered, the user identification ID, the authentication password, and the recovery program are sent to the general-purpose computer 1. If it is judged in S44 that the device ID has not been registered., the user identification ID and the authentication password are sent to the general-purpose computer 1 (S48).

On the side of the general-purpose computer 1, the communication means 4 receives the data which has been sent from the recovery program generation server 2 in S48 (S49). Then it is judged whether or not the received data includes the recovery program, i.e. whether or not the device ID generated in S41 has already been registered in the customer information management database 11 (S50). If the recovery program is identified (YES in S50), the recovery program starts (S51) so that the device ID is renewed.

If it is judged in S50 that the device ID has not been registered, or if the process in S51 is carried out, the user identification ID and the authentication password which are received in S49 are saved (S52).

Figures 8, 9:
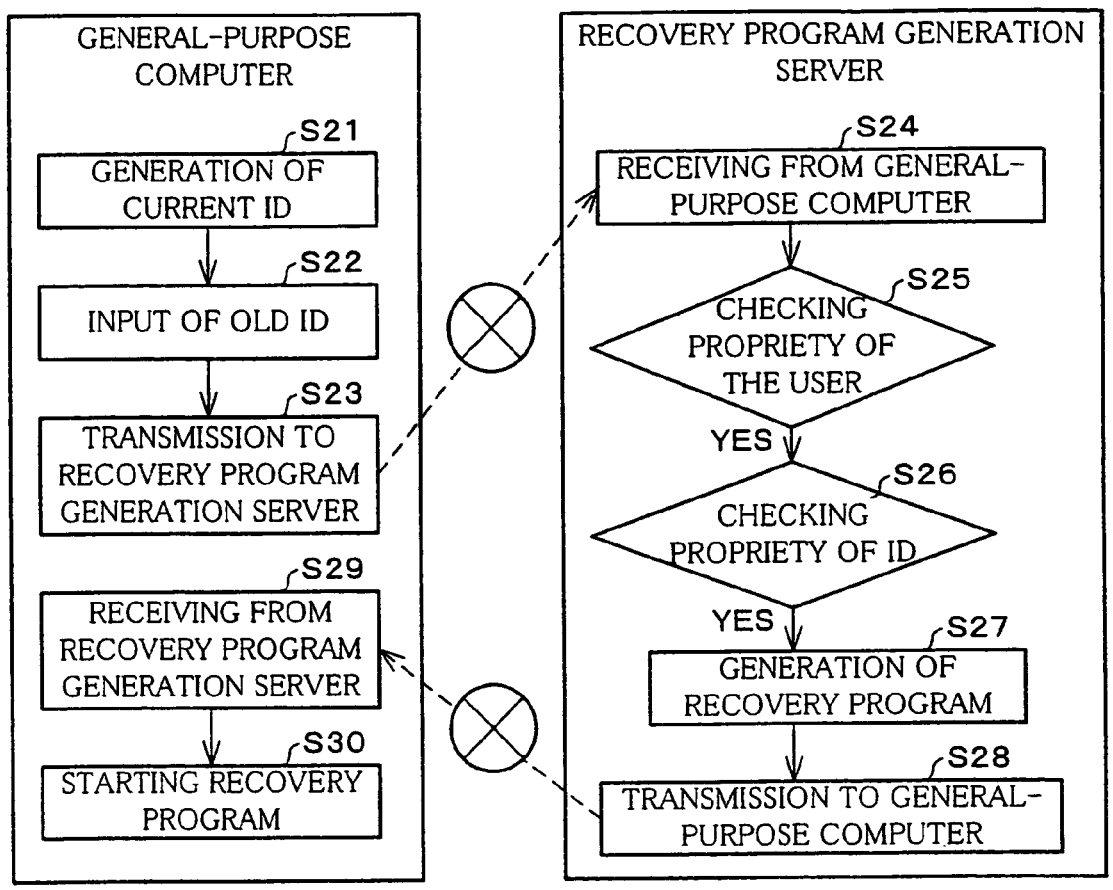
FIG. 8 is a flow chart, illustrating the steps of processing that the device ID of the general-purpose computer is renewed in the arrangement of FIG. 5.
FIG. 9 illustrates the content of data which is supplied to a recovery program generation server by communication means of a general-purpose computer, in a communication system in accordance with a further embodiment of the present invention.

After the completion of the initial registration as above, the renewal of the device ID, which has been described in Embodiment 2 according to the flow chart in FIG. 8, is appropriately conducted in the general-purpose computer 1.

It is noted that after the completion of the initial registration as illustrated in the present embodiment, the renewal of the device ID of the general-purpose computer 1 may be carried out in accordance with the method described in Embodiment 3. That is to say, the data supplied from the general-purpose computer 1 to the recovery program generation server 2 may include only a device ID to be recovered, or may include a user identification ID, an authentication password, and a device ID to be recovered. In this case, the recovery program generation means 7 of the recovery program generation server 2 generates a recovery program for replacing a current device ID with the device ID to be recovered, in accordance with the device ID to be recovered, which has been received. Then on the side of the general-purpose computer 1, after receiving this recovery program, the process of recovering the old ID is carried out without judging whether or not the current ID corresponds to a current ID included in the recovery program.

As described above, the communication system in accordance with the present embodiment is arranged in such a manner that, after a device ID is newly generated, the general-purpose computer 1 sends this new device ID to the recovery program generation server 2, then in the recovery program generation server 2, the device ID search means 13 judges whether or not the new device ID which has been received from the general-purpose computer 1 corresponds to one of device IDs of the users, which are registered in the customer information management database 11, and if no corresponding device ID is found, the received new device ID is registered in the customer information management database 11 as a device ID of the user. That is to say, when the reproduction means 3 on the side of the general-purpose computer 1 generates a device ID using random numbers, the device ID is possibly identical with a device ID of another user. With the arrangement above, it is possible to eliminate such a case that a plurality of identical device IDs are registered in the customer information management database 11 of the recovery program generation server 2. On this account, it is possible to ensure the management of device IDs registered in the customer information management database 11.

Moreover, in the recovery program generation server 2, if it is identified that a device ID which is identical with a received new device ID has already been registered in the customer information management database 11, the device ID issuing means 12 generates a device ID which has not been registered and a recovery program for altering the device ID of the general-purpose computer 1 to this generated device ID is sent to the general-purpose computer 1. Thus, if a device ID identical with a device ID of another user is determined in the general-purpose computer 1, it is possible to alter the device ID by receiving the recovery program for altering the device ID to an unregistered device ID. With this arrangement, it is possible to set the device ID of the general-purpose computer 1 as an appropriate device ID which is not identical with any device IDs of other users, and also on the side of the recovery program generation server 2, it is possible to ensure the management of device IDs in the customer information management database 11.

Embodiment 5

Referring to figures, the following will describe still another embodiment of the present invention. By the way, members having the same functions as those described in the foregoing embodiments are given the same numbers, so that the descriptions are omitted for the sake of convenience.

The present embodiment also relates to the system in which after a new device ID is generated, the device ID is registered to a customer information management database 11 as in Embodiment 4, and the present embodiment is different from Embodiments 2 and 3 in respect of the process of renewing the device ID in a general-purpose computer 1.

In Embodiments 1 and 2, both a current device ID and a device ID to be recovered are sent from the general-purpose computer 1, and on the side of the recovery program generation server 2, a recovery program for replacing the current device ID with the device ID to be recovered is generated so as to be supplied to the general-purpose computer 1. In Embodiment 3, a device ID to be recovered is supplied from the general-purpose computer 1, and on the side of the recovery program generation server 2, a recovery program, which is for replacing the current device ID with a device ID to be recovered, without considering the authenticity of the current device ID, is generated, and then the recovery program is sent to the general-purpose computer 1.

In contrast, compared to the system of Embodiment 2, a system of the present embodiment is arranged so that a device ID to be recovered is not included in the data which is transmitted from the general-purpose computer 1 to the recovery program generation server 2. That is to say, compared to Embodiment 2, the data transmitted from the general-purpose computer 1 to the recovery program generation server 2 only includes, as FIG. 14 illustrates, a user identification ID, an authentication password, and a current device ID.

Figures 13, 14, 15:
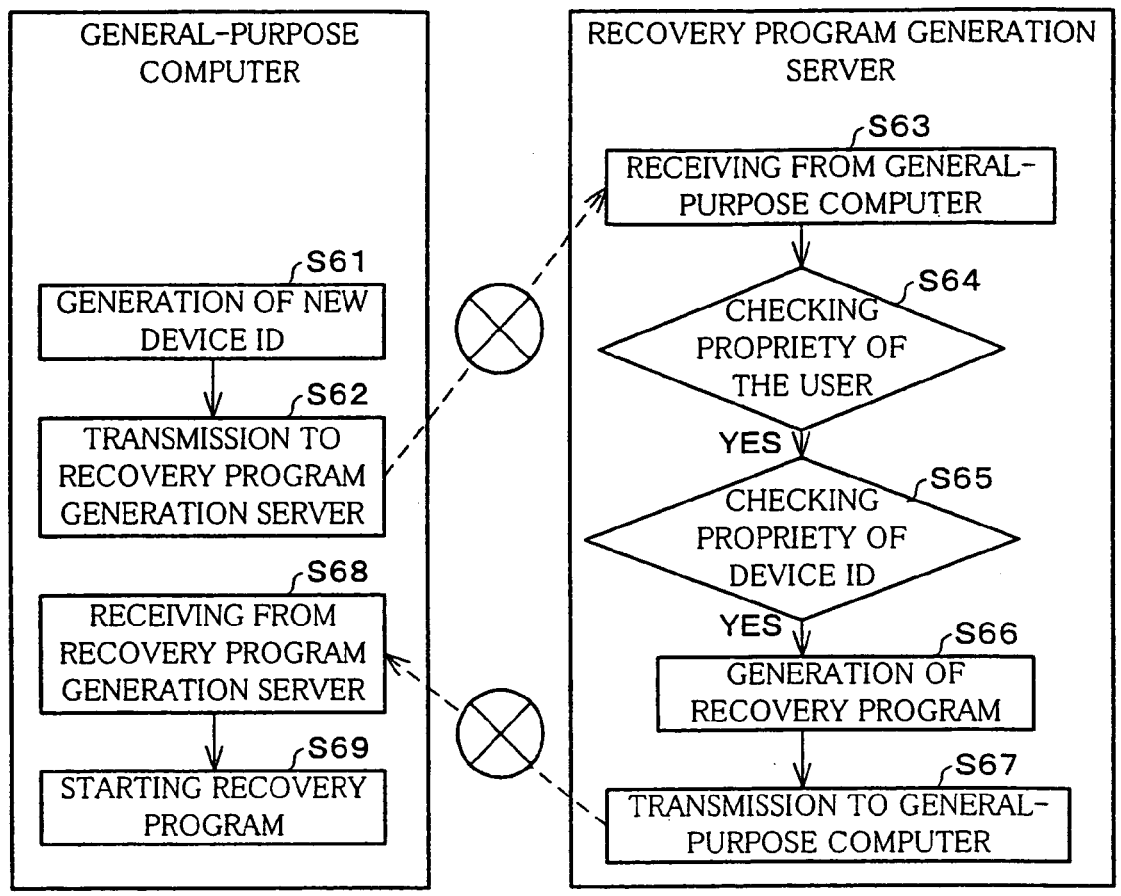
FIG. 13 is a flow chart, illustrating the steps of processing that the device ID of a general-purpose computer is renewed in a communication system in accordance with still another embodiment of the present invention.
FIG. 14 illustrates the content of data which is supplied to a recovery program generation server by communication means of the general-purpose computer, in the steps of processing in the communication system of FIG. 13.
FIG. 15 illustrates the content of data which is supplied to a recovery program generation server by communication means of the general-purpose computer, in alternative steps of processing in the communication system of FIG. 13.

Now, in reference to the flow chart in FIG. 13, the following will describe the steps of processing to renew the device ID of the general-purpose computer 1. Note that, the flow chart of FIG. 13 indicates that the processing in S61-S62 and in S68-S69 is carried out on the side of the general-purpose computer 1, while the processing in S63-67 is carried out on the side of the recovery program generation server 2.

First, in S61, a new device ID is generated in accordance with the reinstall of an electronic book reproduction program, etc. Then a communication means 4 sends the data illustrated in FIG. 14, i.e. a user identification ID, an authentication password, and a current device ID, to the recovery program generation server 2 (S62).

On the side of the recovery program generation server 2, the communication means 9 receives the data which has been sent from the general-purpose computer 1 in S62 (S63). Then from the received data, the user identification ID and the authentication password are retrieved, and according to a customer information management database, a user identification means 10 judges whether or not the user is an authorized user (S64). If it is judged here that the user is not an authorized user, the processing is suspended and the incompletion of the user authentication is notified to the general-purpose computer 1.

If the user is identified as an authorized user, the current device ID is retrieved from the received data and the ID check means 8 checks whether or not the retrieved current device ID is proper (S65). If the ID is identified as a proper ID (YES in S65), a device ID corresponding to the user is read out from the customer information management database 11, and the recovery program generation means 7 generates a recovery program for replacing the current device ID with the device ID corresponding to the user, i.e. with the device ID which is desired to be recovered (S66). In contrast, if the ID is identified as improper in S65, the processing is suspended and the impropriety of the ID is notified to the general-purpose computer 1. After the generation of the recovery program in S66, the recovery program is sent to the general-purpose computer 1 by the communication means 9 (S67).

On the side of the general-purpose computer 1, the communication means 4 receives the recovery program supplied from the recovery program generation server 2 in S67 (S68). Then in S69, the recovery program starts so that the renewal of the device ID is conducted in accordance with the aforementioned processing described in Embodiment 1 with reference to FIG. 3.

It is noted that although the foregoing descriptions relate to the case of adopting the system in which after a new device ID is generated, the device ID is registered to the customer information management database 11 as described in Embodiment 4, the present invention is not limited to this arrangement. That is to say, as long as a system in which the information of a device ID having been determined by the user has been stored in advance is adopted, it is possible to carry out the renewal of a device ID as described in the present embodiment.

However, if the system described in Embodiment 4 is adopted, it is unnecessary for the user to input the device ID on the side of the general-purpose computer 1 on the occasion of the initial registration of the device ID, and also it is unnecessary for the user to input, for instance, the device ID to be recovered, on the occasion of the renewal of the device ID. Thus, in the present embodiment, it is unnecessary to provide an ID input means 6 in the general-purpose computer 1, and hence it is possible to save the labor of the user of the general-purpose computer 1.

Moreover, although the data supplied from the general-purpose computer 1 to the recovery program generation server 2 in the foregoing arrangement is, as illustrated in FIG. 14, composed of a user identification ID, an authentication password, and a current device ID, it is possible to omit the current device ID therefrom. That is to say, the data supplied from the general-purpose computer 1 to the recovery program generation server 2 may include, as illustrated in FIG. 15, only the user identification ID and the authentication password. In this case, as in the flow chart in FIG. 13, the process in S65 is omitted and the recovery program generated in S66 by the recovery program generation means 7 alters the current device ID to a device ID to be recovered, without considering the authenticity of the current device ID.

With the system arranged as above, it is possible to reduce the amount of the data supplied from the general-purpose computer 1 to the recovery program generation server 2. Moreover, by the recovery program a current device ID is replaced with a current device ID to be recovered, regardless of the authenticity of the current device ID. Therefore, if this recovery program is stored in the general-purpose computer 1, it is possible to recover a device ID using the recovery program, on occasions when it is necessary to reinstall an OS or a content player. With this arrangement, it is unnecessary to send the recovery program from the recovery program generation server 2 again.

As described above, a communication system in accordance with the present invention, which comprises: a terminal device including reproduction means which carries out reproduction of a digital content; and a server machine which is connected to the terminal device via a communication link and includes program generation means for generating a device ID alteration program by which a device ID of the terminal device is altered, is arranged in such a manner that: the reproduction means includes ID setting means for setting a device ID corresponding to the terminal device; the digital content is reproduced only when a device ID included in the digital content corresponds to a device ID of a device by which it is intended to reproduce the digital content; when the device ID alteration program is supplied from the server machine, the device ID of the terminal device is altered in accordance with the device ID alteration program; and when the server machine receives a request to alter the device ID from the terminal device, the device ID alteration program is sent to the terminal device.

Moreover, in the foregoing arrangement, the communication system in accordance with the present invention may be arranged in such a manner that: the reproduction means sends a current device ID and a device ID which is desired to be recovered, to the server machine, the server machine further includes ID check means for checking whether or not the device ID which has been received is proper, and if the ID check means judges that the device ID is a proper ID, the program generation means generates the device ID alteration program by which the current device ID which has been received is replaced with the device ID which is desired to be recovered, then the device ID alteration program is supplied to the terminal device.

According to this arrangement, first, on the side of the terminal device, the reproduction means transmits a current device ID and a device ID to be recovered, towards the server machine. Then on the side of the server machine, the ID check means checks whether the received device ID to be recovered is proper or not. Subsequently the device ID alteration program for replacing the current device ID with the device ID to be recovered is generated, thereby supplied to the terminal device. Thus, since the transmission of the device ID alteration program is carried out after the propriety of the received device ID is checked by the ID check means, it is possible to prevent the use of improper device IDs, and this ensures the copyright protection of digital contents.

Moreover, in the foregoing arrangement, the communication system in accordance with the present invention may be arranged in such a manner that, the reproduction means sends (i) a user identification ID for identifying a user, (ii) an authentication password corresponding to the user identification ID, (iii) a current device ID, and (iv) a device ID which is desired to be recovered, to the server machine, the server machine further includes: ID check means for checking whether or not the device ID which has been received is proper; a customer information management database which stores user identification IDs of formally registered users and corresponding authentication passwords; and user identification means for judging whether or not the user identification ID and the authentication password, which have been received, correspond to any one of the user identification IDs and any one of the authentication IDs, which are stored in the customer information management database, and if the ID check means judges that the device ID is a proper ID and the user identification means confirms that the user is formally registered, the program generation means generates the device ID alteration program by which the current device ID which has been received is replaced with the device ID which is desired to be recovered, then the device ID alteration program is supplied to the terminal device.

According to this arrangement, first, on the side of the terminal device, the reproduction means sends a user identification ID, an authentication password, a current device ID, and a device ID to be recovered, towards the server machine. Then in the server machine, the ID check means checks the propriety of the received device ID, and the user identification means judges whether or not the user is a formally registered user, in reference to the customer information management database. As a result, a device ID alteration program for replacing the received current device ID with the device ID to be recovered is generated, so as to be sent to the terminal device. Thus, since the transmission of the device ID alteration program is carried out after the ID check means certifies the propriety of the received device ID and the user identification means certifies the user registration, only proper users who have been formally registered are allowed to alter the device ID, and hence it is possible to prevent the improper alteration of device IDs and this ensures the copyright protection of digital contents.

Moreover, in the foregoing arrangement, the communication system in accordance with the present invention may be arranged in such a manner that, the reproduction means sends (I) a user identification ID for identifying a user, (II) an authentication password corresponding to the user identification ID, and (III) a device ID which is desired to be recovered, to the server machine, the server machine further includes: a customer information management database which stores user identification IDs of formally registered users and corresponding authentication passwords; and user identification means for judging whether or not the user identification ID and the authentication password, which have been received, correspond to any one of the user identification IDs and any one of the authentication IDs, which are stored in the customer information management database, and if the user identification means confirms that the user is formally registered, the program generation means generates the device ID alteration program by which the current device ID which has been received is replaced with the device ID which is desired to be recovered, then the device ID alteration program is supplied to the terminal device.

According to this arrangement, first, on the side of the terminal device, the reproduction means sends a user identification ID, an authentication password, and a device ID to be recovered, towards the server machine, then on the side of the server machine, the user identification means judges whether or not the user is a formally registered user, in reference to the customer information management database, and subsequently a device ID alteration program, which alters a current device ID to the device ID to be recovered, is generated, so as to be sent to the terminal device. Thus, since the transmission of the device ID alteration program is carried out after the user identification means certifies the user registration, only users who have been formally registered are allowed to alter the current device ID, and hence it is possible to prevent the improper alteration of device IDs and this ensures the copyright protection of digital contents.

Since the propriety of the user is judged in reference to the user identification ID and the authentication password, it is unnecessary to send the current device ID from the terminal device to the server machine. On this account, it is possible to reduce the amount of data to be sent from the terminal device to the server machine.

Moreover, since the device ID alteration program alters a current device ID to a device ID to be recovered, regardless of the authenticity of the current device ID, if this program is stored in the terminal device, it is possible to recover the device ID on the occasion of the reinstall of an OS and a content player again, using the device ID alteration program which has been stored. Thus, this arrangement makes it unnecessary to send the device ID alteration program from the server machine again.

Moreover, in the foregoing arrangement, the communication system in accordance with the present invention may be arranged in such a manner that, the reproduction means sends (1) a user identification ID for identifying a user, (2) an authentication password corresponding to the user identification ID, and (3) a current device ID, to the server machine, the server machine further includes: ID check means for checking whether or not the device ID which has been received is proper; a customer information management database which stores user identification IDs of formally registered users, corresponding authentication passwords, and device IDs of the users; and user identification means for judging whether or not the user identification ID and the authentication password, which have been received, correspond to any one of the user identification IDs and any one of the authentication IDs, which are stored in the customer information management database, and if the ID check means judges that the device ID is a proper ID and the user identification means confirms that the user is formally registered, the program generation means generates the device ID alteration program by which the current device ID which has been received is replaced with a device ID which has been stored in the customer information management database, then the device ID alteration program is supplied to the terminal device.

According to this arrangement, first, on the side of the terminal device, the reproduction means sends a user identification ID, an authentication password, and a current device ID, towards the server machine, then on the side of the server machine, the ID check means judges whether or not the received device ID is proper, and in reference to the customer information management database, the user identification means judges whether or not the user is a formally registered user. Subsequently a device ID alteration program, by which the current device ID which has been received is replaced with a device ID which has been stored in the customer information management database, is generated, then the device ID alteration program is supplied to the terminal device. Thus, since the transmission of the device ID alteration program is carried out after the ID check means checks the propriety of the received device ID and the user identification means certifies the user registration, only users who have been formally registered are allowed to alter the device ID, and hence it is possible to prevent the improper alteration of device IDs and this ensures the copyright protection of digital contents.

Further, since the device ID altered by the device ID alteration program is a device ID stored in the customer information management database, it is unnecessary to send a device to be recovered, from the terminal device to the server machine. Thus this enables to reduce the amount of data supplied from the terminal device to the server machine. Moreover, on the side of the terminal device, the arrangement makes it unnecessary to input a device ID to be recovered, and hence it is possible to save the labor of the user of the terminal device.

Moreover, in the foregoing arrangement, the communication system in accordance with the present invention may be arranged in such a manner that, the reproduction means sends a user identification ID for identifying a user and an authentication password corresponding to the user identification ID, to the server machine, the server machine further includes: a customer information management database which stores user identification IDs of formally registered users, corresponding authentication passwords, and device IDs of the users; and user identification means for judging whether or not the user identification ID and the authentication password, which have been received, correspond to any one of the user identification IDs and any one of the authentication IDs, which are stored in the customer information management database, and if the user identification means confirms that the user is formally registered, the program generation means generates the device ID alteration program by which the current device ID which has been received is replaced with the device ID which has been stored in the customer information management database, then the device ID alteration program is supplied to the terminal device.

According to this arrangement, first, on the side of the terminal device, the reproduction means sends a user identification ID and an authentication password towards the server machine, then on the side of the server machine, the user identification means judges whether or not the user is a formally registered user, in reference to the customer information management database. Subsequently a device ID alteration program, by which the current device ID which has been received is replaced with a device ID which has been stored in the customer information management database, is generated, then the device ID alteration program is supplied to the terminal device. Thus, since the transmission of the device ID alteration program is carried out after the user identification means certifies the user registration, only users who have been formally registered are allowed to alter the device IDs, and hence it is possible to prevent the improper alteration of device IDs and this ensures the copyright protection of digital contents.

Furthermore, the propriety of the user is judged in reference to the user identification ID and the authentication password and this makes it unnecessary to send the current device ID from the terminal device to the server machine. Thus, it is possible to reduce the amount of data supplied from the terminal device to the server machine.

Moreover, since the device ID altered by the device ID alteration program is a device ID stored in the customer information management database, it is unnecessary to send a device ID to be recovered, from the terminal device to the server machine. Thus this enables to reduce the amount of data supplied from the terminal device to the server machine. Also, on the side of the terminal device, the arrangement makes it unnecessary to input a device ID to be recovered, and hence it is possible to save the labor of the user of the terminal device.

Moreover, since the device ID alteration program alters a current device ID to a device ID which has been stored in the customer information management database, regardless of the authenticity of the current device ID, if this recovery program is stored in the terminal device, it is possible to recover the device ID on the occasion of the reinstall of an OS and a content player again, using the device ID alteration program which has been stored. Thus, this arrangement makes it unnecessary to send the device ID alteration program from the server machine again.

Moreover, in the foregoing arrangement, the communication system in accordance with the present invention may be arranged in such a manner that: the server machine further includes device ID search means; the customer information management database further stores device IDs of the users; when the ID setting means of the reproduction means newly generates a device ID, the terminal device sends the newly generated device ID, to the server machine; and in the server machine, the device ID search means judges whether or not a device ID, which is identical with the newly generated device ID which has been received, is included in the customer information management database, and if no identical device ID is stored, the newly generated device ID which has been received is registered to the customer information management database as a device ID of the user.

According to this arrangement, after a device ID is newly generated, the terminal device sends this new device ID to the server machine, then in the server machine, the device ID search means judges whether or not the new device ID which has been received from the terminal device corresponds to one of device IDs of the users, which are registered in the customer information management database, and if no corresponding device ID is found, the received new device ID is registered in the customer information management database as a device ID of the user. That is to say, when the reproduction means on the side of the terminal device generates a device ID using random numbers, the device ID is possibly identical with a device ID of another user. With the arrangement above, it is possible to eliminate such a case that a plurality of identical device IDs are registered in the customer information management database of the server machine. On this account, it is possible to ensure the management of device IDs registered in the customer information management database.

Moreover, in the foregoing arrangement, the communication system in accordance with the present invention may be arranged in such a manner that: the server machine further includes device ID issuing means; when the device ID search means confirms that a device ID, which is identical with the newly generated device ID which has been received, is included in the customer information management database, the device ID issuing means generates a device ID which has not been stored in the customer information management database; and the device ID alteration program, which is for alteration to the device ID which has been generated, is sent to the terminal device.

According to this arrangement, when it is judged in the server machine that a device ID which is identical with the newly-generated device ID which has been received is stored in the customer information management database, the device ID issuing means generates a device ID which has not been registered, and the device ID alteration program by which this device ID is assigned is supplied to the terminal device. Thus, even if a device ID which is identical with that of another user is determined in the terminal device, it is possible to alter the device ID by receiving the device ID alteration program by which the device ID is replaced with a device ID which has not been registered. With this arrangement, it is possible to assign a proper device ID, which is not identical with device IDs of other users, to the terminal device, and on the side of the server machine, it is possible to ensure the management of device IDs registered in the customer information management database.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, a communication system in accordance with the present invention is arranged in such a manner that, when a device ID of a terminal device, which reproduces digital contents and is controlled in accordance with the digital ID, is altered due to reasons such as the trouble of the device, a device ID alteration program is supplied from a server machine so that starting this program makes it possible to recover the device ID. With this arrangement, it is possible to solve problems such as, for instance, after the alteration of the device ID, digital contents which have previously purchased are no longer reproduced by the device.

What is claimed is:

1. A communication system, comprising:
   a terminal device including reproduction means which carries out reproduction of a digital content; and
   a server machine which is connected to the terminal device via a communication link and includes program generation means for generating a device ID alteration program by which a device ID of the terminal device is altered,
   the communication system being characterized in that:
      the reproduction means includes ID setting means for setting a device ID corresponding to the terminal device; the digital content is reproduced only when a device ID included in the digital content corresponds to a device ID of a device by which it is intended to reproduce the digital content; when the device ID alteration program is supplied from the server machine, the device ID of the terminal device is altered in accordance with the device ID alteration program; and when the server machine receives a request to alter the device ID from the terminal device, the device ID alteration program is sent to the terminal device, and
   the reproduction means sends only (I) a user identification ID for identifying a user, (II) an authentication password corresponding to the user identification ID, and (III) a device ID which is desired to be recovered, to the server machine,
   the server machine further includes:
      a customer information management database which stores user identification IDs of formerly registered users and corresponding authentication passwords; and user identification means for judging whether or not the user identification ID and the authentication password, which have been received, correspond to any one of the user identification IDs and any one of the authentication passwords, which are stored in the customer information management database, and
      if the user identification means confirms that the user is formally registered, the program generation means generates a device alteration program by which the device ID set by the setting means of the reproduction means is replaced with the device ID which is desired to be recovered, and thereafter the device ID alteration program is supplied to the terminal device.

2. The communication system as defined in claim 1, characterized in that:
   the server machine further includes device ID search means;
   the customer information management database further stores device IDs associated with the formally registered users;
   when the ID setting means of the reproduction means newly generates a device ID, the terminal device sends the newly generated device ID, to the server machine; and
   in the server machine, the device ID search means judges whether or not a device ID, which is identical with the newly generated device ID which has been received, is included in the customer information management database, and if no identical device ID is stored, the newly generated device ID which has been received is registered to the customer information management database as a device ID of the user.

3. The communication system as defined in claim 2, characterized in that:
   the server machine further includes device ID issuing means; and
   when the device ID search means confirms that a device ID, which is identical with the newly generated device ID which has been received, is included in the customer information management database, the device ID issuing means generates a device ID which has not been stored in the customer information management database; and
   the program generating means generates a device ID alteration program by which the device ID generated by the setting means of the reproducing means is replaced by the device ID generated by the device ID issuing means, and thereafter the device ID alteration program is sent to the terminal device.

4. A communication system comprising:
a terminal device including reproduction means which carries out reproduction of a digital content; and
a server machine which is connected to the terminal device via a communication link and includes program generation means for generating a device ID alteration program by which a device ID of the terminal device is altered,
the communication system being characterized in that:
the reproduction means includes ID setting means for setting a device ID corresponding to the terminal device; the digital content is reproduced only when a device ID included in the digital content corresponds to a device ID of a device by which it is intended to reproduce the digital content; when the device ID alteration program is supplied from the server machine, the device ID of the terminal device is altered in accordance with the device alteration program, when the server machine receives a request to alter the device ID from the terminal device, the device ID alteration program is sent to the terminal device, and
the reproduction means sends only a user identification ID for identifying a user and an authentication password corresponding to the user identification ID, to the server machine,
the server machine further includes:
a customer information management database which stores user identification IDs of formally registered users, corresponding authentication passwords, and device IDs previously associated with the formally registered users; and
user identification means for judging whether or not the user identification ID and the authentication password, which have been received, correspond to any one of the user identification IDs and any one of the authentication passwords, which are stored in the customer information management database, and
if the user identification means confirms that the user is formally registered, the program generation means generates the device ID alteration program by which the device ID set by the setting means of the reproduction means is replaced with the device ID previously associated with the formally registered user which has been stored in the customer information management database, and thereafter the device ID alteration program is supplied to the terminal device.

5. The communication system as defined in claim 4, characterized in that:
the server machine further includes device ID search means;
the customer information management database further stores device IDs associated with the formally registered users;
when the ID setting means of the reproduction means newly generates a device ID, the terminal device sends the newly generated device ID to the server machine; and
in the server machine, the device ID search means judges whether or not a device ID, which is identical with the newly generated device ID which has been received, is included in the customer information management database, and if no identical device ID is stored, the newly generated device ID of the user which has been received is registered to the customer information management database as a device ID of the user.

6. The communication system as defined in claim 5, characterized in that:
the server machine further includes device ID issuing means such that when the device ID search means confirms that a device ID, which is identical with the newly generated device ID which has been received, is included in the customer information management database, the device ID issuing means generates a device ID which has not been stored in the customer information management database; and the program generating means generates a device ID alteration program by which the device ID generated by the setting means of the reproduction means is replaced by the device ID generated by the device ID issuing means, and thereafter the device ID alteration program is sent to the terminal device.

7. A server machine, which is connected to a terminal device including reproduction means for reproducing a digital content, via a communication network, and includes:
program generation means for generating a device ID alteration program by which a device ID of the terminal device is altered;
a customer information management database which stores user identification IDs of formally registered users and corresponding authentication passwords;
user identification means for judging whether or not a user identification ID desired to be recovered and a corresponding authentication password, which have been received, correspond to any one of the user identification IDs and any one of the authentication passwords, which are stored in the customer information management database such that if the user identification means confirms that the user is formally registered, the program generation means generates a device ID alteration program by which the device ID set by the setting means of the reproduction means is replaced with the device ID which is desired to be recovered; and
communication means which carries out data transmission with the terminal device such that when the communication means receives a request to alter the device ID from the terminal device, the device ID alteration program is sent to the terminal device,
wherein:
the reproduction means sets a device ID corresponding to the terminal device, and sends, to the server machine, only (I) a user identification ID for identifying a user, (II) an authentication password corresponding to the user identification ID, and (III) a device ID which is desired to be recovered;
the digital content is reproduced only when a device ID included in the digital content corresponds to a device ID of a device by which it is intended to reproduce the digital content;
when the device ID alteration program is supplied from the server machine, the device ID of the terminal device is altered in accordance with the device ID alteration program.

8. A storage medium which stores a server program for execution in a server machine which is connected, via a communication network, to a terminal device including reproduction means for reproducing a digital content,
the terminal device being arranged in such a manner that:
the reproduction means sets a device ID corresponding to the terminal device and sends, to the server, machine, only (I) a user identification ID for identifying a user, (II) an authentication password corresponding to the user identification ID, and (III) a device ID which is desired to be recovered;

the digital content is reproduced by the reproduction means only when a device ID included in the digital content corresponds to a device ID of a device by which it is intended to reproduce the digital content;

when a device ID alteration program is supplied from the server machine, the device ID of the terminal device is altered in accordance with the device ID alteration program, and the server machine being arranged in such a manner that:
user identification means judges whether or not the user identification ID and the authentication password, which have been received, correspond to any one of the user identification IDs and any one of the authentication passwords, which are stored in a customer information management database which stores user identification IDs of formally registered users an corresponding authentication passwords, the server program being characterized by causing the server machine to effect the process of:
performing the judgment by the user identification means:
if it is judged that the user is formally registered, generating the device ID alteration program by the program generation means, by which the device ID which has been received is replaced with the device ID which is desired to be recovered;
carrying out data transmission with the terminal device; and
sending the device ID alteration program to the terminal device, when receiving a request to alter the device ID from the terminal device.

9. A server machine, which is connected to a terminal device including reproduction means for reproducing a digital content,
via a communication network, and includes:
program generation means for generating a device ID alteration program by which a device ID of the terminal device is altered;
a customer information management database which stores user identification IDs of formally registered users and corresponding authentication passwords;
user identification means for judging whether or not a user identification ID desired to be recovered and a corresponding authentication password, which have been received, correspond to any one of the user identification IDs and any one of the authentication passwords, which are stored in the customer information management database such that if the user identification means confirms that the user is formally registered, the program generation means generates a device ID alteration program by which the current device ID is replaced with the device ID which is desired to be recovered; and
communication means which carries out data transmission with the terminal device such that when the communication means receives a request to alter the device ID from the terminal device, the device alteration program is sent to the terminal device, wherein:
the reproduction means sets a device ID corresponding to the terminal device, and sends, to the server machine, only (I) a user identification ID for identifying a user and (II) a device ID which is desired to be recovered;
the digital content is reproduced only when a device ID included in the digital content corresponds to a device ID of a device by which it is intended to reproduce the digital content;
when the device ID alteration program is supplied from the server machine, the device ID of the terminal device is altered in accordance with the device ID alteration program.

10. A storage medium which stores a server program for execution in a server machine which is connected, via a communication network, to a terminal device including reproduction means for reproducing a digital content,
the terminal device being arranged in such a manner that:
the reproduction means sets a device ID corresponding to the terminal device and sends, to the server machine, only (I) a user identification ID for identifying a user and (II) a device ID which is desired to be recovered;
the digital content is reproduced by the reproduction means only when a device ID included in the digital content corresponds to a device ID of a device by which it is intended to reproduce the digital content;
when a device ID alteration program is supplied from the server machine, the device ID of the terminal device is altered in accordance with the device ID alteration program, and
the server machine being arranged in such a manner that:
user identification means judges whether or not the user identification ID and the authentication password, which have been received, correspond to any one of the user identification IDs and any one of the authentication passwords, which are stored in a customer information management database which stores user identification IDs of formally registered users an corresponding authentication passwords,
the server program being characterized by causing the server machine to effect the process of:
performing the judgment by the user identification means;
if it is judged that the user is formally registered, generating the device ID alteration program by the program generation means, by which the device ID which has been received is replaced with the device ID which is desired to be recovered;
carrying out data transmission with the terminal device; and
sending the device ID alteration program to the terminal device, when receiving a request to alter the device ID from the terminal device.

* * * * *